United States Patent [19]

Nakagawa et al.

[11] Patent Number: 5,707,600
[45] Date of Patent: Jan. 13, 1998

US005707600A

[54] PROCESS FOR PREPARING MEDIUM PORE SIZE ZEOLITES USING NEUTRAL AMINES

[75] Inventors: Yumi Nakagawa, Oakland; Stacey I. Zones, San Francisco, both of Calif.

[73] Assignee: Chevron U.S.A. Inc., San Francisco, Calif.

[21] Appl. No.: 610,449

[22] Filed: Mar. 4, 1996

Related U.S. Application Data

[63] Continuation-in-part of Ser. No. 406,087, Mar. 17, 1995, abandoned.

[51] Int. Cl.$^6$ .................. C01B 39/04; B01J 29/06
[52] U.S. Cl. .................. 423/701; 423/702; 423/703; 423/704; 423/705; 423/706; 423/707; 423/708; 423/718; 423/DIG. 22; 423/DIG. 36; 502/62
[58] Field of Search .................. 423/701, 702, 423/703, 704, 705, 706, 707, 708, 718, DIG. 22, DIG. 36; 502/62

[56] References Cited

U.S. PATENT DOCUMENTS

| | | | |
|---|---|---|---|
| 4,076,842 | 2/1978 | Plank et al. | 423/328 |
| 4,151,189 | 4/1979 | Rubin et al. . | |
| 4,296,083 | 10/1981 | Rollmann . | |
| 4,337,176 | 6/1982 | Boersma et al. | 252/459 |
| 4,377,502 | 3/1983 | Klotz | 252/455 |
| 4,483,835 | 11/1984 | Zones | 423/277 |
| 4,495,166 | 1/1985 | Calvert et al. . | |
| 4,661,467 | 4/1987 | Kuehl | 502/202 |
| 5,053,373 | 10/1991 | Zones | 502/64 |
| 5,063,038 | 11/1991 | Kirker et al. . | |
| 5,173,281 | 12/1992 | Chang et al. | 423/702 |
| 5,174,977 | 12/1992 | Chang et al. | 423/706 |
| 5,174,978 | 12/1992 | Hellring et al. | 423/708 |
| 5,174,981 | 12/1992 | Hellring et al. | 423/705 |
| 5,190,736 | 3/1993 | Hellrig et al. | 423/706 |
| 5,209,918 | 5/1993 | Hellrig et al. | 423/706 |
| 5,246,688 | 9/1993 | Faust et al. | 423/704 |
| 5,252,527 | 10/1993 | Zones | 502/64 |
| 5,376,260 | 12/1994 | Santilli et al. | 208/111 |
| 5,525,323 | 6/1996 | Meuller et al. | 423/705 |

FOREIGN PATENT DOCUMENTS

| | | |
|---|---|---|
| 12473 | 6/1980 | European Pat. Off. . |
| 103981 | 3/1984 | European Pat. Off. . |
| 116203 | 8/1984 | European Pat. Off. . |
| 2190910 | 2/1987 | United Kingdom . |

OTHER PUBLICATIONS

Parker, L.M. & Bibby, D.M., Synthesis and some properties of two novel zeolites, KZ–1 & KZ–2, 10 Mar. 1982, 8–11.

Database WPI, Section Ch, Week 8616, Derwent Publications Ltd. London, GB; Class E14, AN86–1–3240, XP002006880 & JP,A,61 047 425 (Sumitomo Chem Ind KK), 7 Mar. 1986 (see abstract).

Zeolites For The Nineties. Recent Research Reports. Presented During The 8th International Conference, 10–14 Jul. 1989, Amsterdam, pp. 37–38, XP002005485. ZAHO Daqing, Qui Shilun & Pang Wenqin: "Synthesis of large crystals of ZSM–5 in non alkaline medium by using various templates" (see whole doument).

Database WPI, Section Ch. Week 9419, Derwent Publications Ltd., London, GB; Class E33, AN 94–157887, XP002005458 & SU,A,1, 799 355 (Grozn Oil Inst), 28 Feb. 1993 (see abstract).

Rosemarie Szostak: "Handbook of molecular sieves", 1992, Van Nostrand Reinhold, New York XP002005486, see pp. 551–553 (no month).

*Primary Examiner*—Mark L. Bell
*Assistant Examiner*—Louis M. Troilo
*Attorney, Agent, or Firm*—R. J. Sheridan

[57] ABSTRACT

The present invention relates to a process for preparing medium pore size zeolites using small, neutral amines capable of forming the zeolite, the amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom, wherein the process is conducted in the absence of a quaternary ammonium compound.

19 Claims, No Drawings

PROCESS FOR PREPARING MEDIUM PORE SIZE ZEOLITES USING NEUTRAL AMINES

CROSS REFERENCE TO RELATED APPLICATION

This application is a continuation-in-part of application Ser. No. 08/406,087, filed Mar. 17, 1995, now abandoned.

BACKGROUND OF THE INVENTION

1. Field of the Invention

The present invention relates to a process for preparing medium pore size zeolites using neutral amines.

2. State of the Art

Medium pore size zeolites, such as those designated SSZ-32 and ZSM-23, and methods for making them are known. For example, U.S. Pat. No. 5,053,373, issued Oct. 1, 1991 to Zones, discloses the preparation of zeolite SSZ-32 using an N-lower alkyl-N'-isopropylimidazolium cation as an organic templating agent. Likewise, U.S. Pat. No. 4,076,842, issued Feb. 28, 1978 to Plank et al., discloses the preparation of zeolite ZSM-23 using a cation derived from pyrrolidine as the template.

U.S. Pat. No. 4,205,053, issued May 27, 1980 to Rollmann et al., discloses a process for manufacturing zeolites such as medium pore size, multidimensional ZSM-5 in which the shape or some other feature of the microscopic crystals is controlled by including in the forming solution an organic basic nitrogen compound in addition to an organic nitrogenous template. Examples of the basic nitrogen compound include amines such as tributylamine, trimethylamine, diisobutylamine, cyclohexylamine, isobutylamine, diisopropylamine, cycloheptylamine, n-octylamine, triethylamine, tert-octylamine, piperidine and piperazine.

Copending U.S. patent application Ser. No. 08/407,432, filed Mar. 17, 1995 of S. I. Zones and Y. Nakagawa entitled "Preparation of Zeolites Using Organic Template and Amine" discloses that zeolites, including medium pore size, unidimensional zeolites, can be prepared using a mixture of an amine component comprising (1) at least one amine containing one to eight carbon atoms, ammonium hydroxide, and mixtures thereof, and (2) an organic templating compound capable of forming the zeolite in the presence of the amine component, wherein the amine is smaller than the organic templating compound. Examples of the amines include isopropylamine, isobutylamine, n-butylamine, piperidine, 4-methylpiperidine, cyclohexylamine, 1,1,3,3-tetramethylbutylamine and cyclopentylamine and mixtures of such amines.

It has now been found that medium pore size zeolites can be prepared using small, neutral amines such as isobutylamine, diisobutylamine, trimethylamine, cyclopentylamine, diisopropylamine, sec-butylamine, 2,5-dimethylpyrrolidine and 2,6-dimethylpiperidine instead of the previously used organic templating agents.

SUMMARY OF THE INVENTION

In accordance with the present invention, there is provided a process for preparing a medium pore size zeolite which comprises:

(a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) at least one small, neutral amine capable of forming the zeolite, said amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom;

(b) maintaining the aqueous solution under conditions sufficient to form crystals of the zeolite; and (c) recovering the crystals of the zeolite, wherein said process is conducted in the absence of a quaternary ammonium compound.

In a preferred embodiment, the present invention provides said process which is performed in the absence of any nitrogen-containing organic templating agent other than the small, neutral amine of this invention.

Preferably, the medium pore size zeolites prepared by the process of this invention have unidimensional channels.

The present invention also provides this process further comprising replacing alkali and/or alkaline earth metal cations of the recovered medium pore size zeolite, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

The present invention also provides a medium pore size zeolite composition, as-synthesized and in the anhydrous state, whose general composition, in terms of mole ratios, is as follows:

| | |
|---|---|
| $YO_2/W_2O_3$ | $\geq 15$ |
| $Q/YO_2$ | 0.02–0.10 |
| $M_{2/n}/YO_2$ | 0.015–0.10 | wherein Y is silicon, germanium or a mixture thereof; W is aluminum, gallium, indium, iron, titanium, or mixtures thereof; Q is at least one small, neutral amine capable of forming said zeolite, said amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom; M is an alkali metal cation, alkaline earth metal cation or mixtures thereof; and n is the valence of M (i.e., 1 or 2), wherein said composition does not contain a quaternary ammonium compound.

The present invention also provides a preferred embodiment of this composition wherein said composition does not contain any nitrogen-containing organic templating agent other than the small, neutral amine.

Preferably, the as-synthesized medium pore size zeolite has unidimensional channels.

Among other factors, the present invention is based on the discovery that medium pore size zeolites, particularly medium pore size zeolites having unidimensional channels, can be made using small, neutral amines such as isobutylamine, diisobutylamine, trimethylamine, cyclopentylamine, diisopropylamine, sec-butylamine, 2,5-dimethylpyrrolidine and 2,6-dimethylpiperidine. It is particularly surprising that no other organic template (for example, a small amount of quaternary ammonium cation) is needed to induce the crystallization of the medium pore size zeolites. It is also surprising that zeolitic materials with silicon oxide to aluminum oxide molar ratios on the order of 15 or greater can be prepared with these neutral amines.

Use of the small, neutral amines in the present invention provides several advantages. For example, the small, neutral amines are inexpensive compared to previously used organic templating agents. These amines are also easy to remove from the channel system of the zeolite product, and are potentially recyclable. In addition, they can be very selective for making some zeolites, and may result in formation of a product having very small crystallites which exhibit performance advantages. It has also been observed that in some cases the rate of crystallization of the product zeolite using this method is very fast.

DETAILED DESCRIPTION OF PREFERRED EMBODIMENTS

The present invention comprises:

(a) preparing an aqueous solution from sources of oxides capable of forming a medium pore size zeolite and at least one small, neutral amine capable of forming said zeolite, said amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom such as isobutylamine, diisobutylamine, trimethylamine, cyclopentylamine, diisopropylamine, sec-butylamine, 2,5-dimethylpyrrolidine and 2,6-dimethylpiperidine;

(b) maintaining the aqueous solution under conditions sufficient to form crystals of the zeolite; and (c) recovering the crystals of the zeolite, wherein said process is conducted in the absence of a quaternary ammonium compound.

As used herein, the term "medium pore size zeolite" refers to zeolites which have 10-ring openings in their framework structure. Examples of such medium pore size zeolites include those designated SSZ-32, ZSM-23, ZSM-5 and theta-1 (ZSM-22).

Preferably, the medium pore size zeolites prepared in accordance with this invention have unidimensional channels. As used herein, the term "unidimensional" or "unidimensional channels" refers to the fact that the pores in the zeolite form channels which are essentially parallel and do not intersect. The term "multidimensional" or "multidimensional channels", on the other hand, refers to the fact that the pores in the zeolite form channels which do intersect each other.

While not wishing to be bound or limited by any theory, it is believed that the small, neutral amines of this invention act as a templating agent in the reaction which forms the medium pore size zeolite. This is particularly surprising in view of the fact that the organic templating agents previously used to prepare medium pore size zeolites typically contain at least one quaternary ammonium atom in their structure, whereas the small, neutral amines used in the process of this invention do not.

The process of the present invention comprises forming a reaction mixture from sources of alkali and/or alkaline earth metal (M) cations with valences n (i.e., 1 or 2); sources of an oxide of aluminum, iron, gallium, indium, titanium, or mixtures thereof (W); sources of an oxide of silicon, germanium or mixtures thereof (Y); at least one small, neutral amine of this invention (Q); and water, said reaction mixture having a composition in terms of mole ratios within the following ranges:

| Reactants | General | Preferred |
| --- | --- | --- |
| $YO_2/W_2O_3$ | 15–100 | 25–50 |
| $OH^-/YO_2$ | 0.10–0.40 | 0.15–0.30 |
| $Q/YO_2$ | 0.05–0.50 | 0.10–0.30 |
| $M_{2/n}/YO_2$ | 0.05–0.40 | 0.075–0.30 |
| $H_2O/YO_2$ | 10–70 | 25–50 |

Typical sources of aluminum oxide for the reaction mixture include aluminates, alumina, hydrated aluminum hydroxides, and aluminum compounds such as $AlCl_3$ and $Al_2(SO_4)_3$. Typical sources of silicon oxide include silica hydrogel, silicic acid, colloidal silica, tetraalkyl orthosilicates, silica hydroxides, and fumed silicas. Gallium, iron, and germanium can be added in forms corresponding to their aluminum and silicon counterparts. Trivalent elements stabilized on silica colloids are also useful reagents.

The small, neutral amines useful in the practice of this invention are those which are capable of forming the desired zeolite (i.e., one having medium pore size and preferably unidimensional channels) and which contain (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom. The small, neutral amines of this invention may be represented by the following formula:

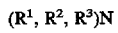

wherein the amine contains only carbon, hydrogen and nitrogen atoms; $R^1$, $R^2$, and $R^3$ are H, $C_1$–$C_4$ alkyl groups, or $R^1$ and $R^2$ together are an alkylene group which forms a 5 or 6 membered ring with the nitrogen atom, provided, however, that not all of $R^1$, $R^2$, and $R^3$ are H; the amine contains a total of about three to about eight carbon atoms; and the amine contains a tertiary nitrogen atom, at least one tertiary carbon atom, or a nitrogen atom bonded directly to at least one secondary carbon atom. Preferably, when $R^1$, $R^2$, or $R^3$ is an alkyl group having more than two carbon atoms, it is a branched chain alkyl group, such as isopropyl, isobutyl or sec-butyl.

As used herein the term "small" refers to the fact that the amine has a total of three to about eight carbon atoms, and the term "neutral" refers to the fact that the nitrogen atom does not have a positive charge. While some protonation of the amine may occur in solution, it should be emphasized that (1) the nitrogen atom of the amine does not have a positive charge when in neat form, and (2) the amine does not contain a quaternary ammonium atom, i.e., does not contain a nitrogen atom bonded to four organic (non-hydrogen) groups. Also, the amines useful in this invention are not considered to be linear amines, i.e., they contain some branching in their structure (as opposed to a linear amine such as butylamine).

In preparing the medium pore size zeolites in accordance with the present invention, the reactants and the small, neutral amine are dissolved in water and the resulting reaction mixture is maintained at an elevated temperature until crystals are formed. The temperatures during the hydrothermal crystallization step are typically maintained from about 100° C. to about 250° C., preferably from about 140° C. to about 200° C. The crystallization period is generally from about 2 days to about 15 days, typically about 4 days. Preferably the crystallization period is from about 2 days to about 7 days.

The hydrothermal crystallization is usually conducted under pressure and usually in an autoclave so that the reaction mixture is subject to autogenous pressure. The reaction mixture should be stirred during crystallization.

Once the crystals have formed, the solid product is separated from the reaction mixture by standard mechanical separation techniques, such as filtration. The crystals are water-washed and then dried, e.g., at 90° C. to 150° C. for from 8 to 24 hours, to obtain the as-synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with crystals of the desired zeolite both to direct, and accelerate the crystallization, as well as to minimize the formation of any undesired crystalline phases. When seed crystals are used, typically about 0.5% to about 5.0% by weight (based on the weight of silica used in the reaction mixture) of the seed crystals are added.

Due to the unpredictability of the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture or to the reaction conditions, such as temperature, and/or crystallization time. Making these modifications are well within the capabilities of one skilled in the art.

The medium pore size zeolite product made by the process of this invention has an as-synthesized composition comprising, in terms of mole ratios in the anhydrous state, the following:

| | |
|---|---|
| $YO_2/W_2O_3$ | $\geq 15$ |
| $Q/YO_2$ | 0.02–0.10 |
| $M_{2/n}/YO_2$ | 0.015–0.10 | wherein Y is silicon, germanium or a mixture thereof; W is aluminum, gallium, indium, iron, titanium, or mixtures thereof; Q is at least one small, neutral amine of this invention; M is an alkali metal cation, alkaline earth metal cation or mixtures thereof; and n is the valence of M, wherein said composition does not contain a quaternary ammonium compound. Preferably, Y is silicon, W is aluminum, and M is potassium.

Typically, the zeolite is thermally treated (calcined) prior to use as a catalyst. Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica/alumina mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include hydrogen and hydrogen precursors, rare earth metals, and metals from Groups IIA, IIIA, IVA, IB, IIB, IIIB, IVB, VIB, and VIII of the Periodic Table of Elements. Of the replacing cations, hydrogen and cations of metals such as rare earth, Mn, Ca, Mg, Zn, Cd, Pt, Pd, Ni, Co, Ti, Al, Sn, Ga, In and Fe are particularly preferred.

The zeolite products were identified by their X-ray diffraction (XRD) pattern. The X-ray powder diffraction patterns were determined by standard techniques. The radiation was the K-alpha/doublet of copper. The peak heights I and the positions, as a function of 2P where P is the Bragg angle, were read from the relative intensities, $100 \times I/I_o$ where $I_o$ is the intensity of the strongest line or peak, and d, the interplanar spacing in Angstroms corresponding to the recorded lines, can be calculated.

The X-ray diffraction pattern of Table I is representative of a calcined medium pore size, unidimensional SSZ-32 zeolite made in accordance with this invention. Minor variations in the diffraction pattern can result from variations in the silica-to-alumina mole ratio of the particular sample due to changes in lattice constants. In addition, sufficiently small crystals will affect the shape and intensity of peaks, leading to significant peak broadening. The variation in the scattering angle (two theta) measurements, due to instrument error and to differences between individual samples, is estimated at ±0.20 degrees.

TABLE I

CALCINED SSZ-32 (MADE WITH ISOBUTYLAMINE)

| 2Theta | d | Rel I[a] |
|---|---|---|
| 7.90[b] | 11.18 | VS |
| 8.12[b] | 10.88 | VS |
| 8.86 | 9.97 | M |
| 11.38 | 7.76 | S |
| 14.60 | 6.06 | W |
| 15.86 | 5.58 | W |
| 16.32 | 5.43 | W |
| 18.12 | 4.89 | W |
| 19.72 | 4.50 | VS |
| 20.96 | 4.24 | VS |
| 22.86 | 3.89 | VS |
| 24.02 | 3.70 | VS |
| 24.62 | 3.61 | S–VS |
| 25.28 | 3.52 | M |
| 25.98 | 3.43 | S |
| 28.26 | 3.16 | W |
| 31.60 | 2.83 | W |
| 35.52 | 2.52 | S |

[a]The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.
[b]These two peaks may have significant overlap, and are sometimes treated as a single peak.

Table IA below shows a typical X-ray diffraction pattern for a calcined SSZ-32 zeolite made in accordance with this invention. In Table IA, the intensity (I) of the peaks or lines is expressed as the intensity relative to the strongest peak or line in the pattern, i.e., $I/I_o \times 100$

TABLE IA

CALCINED SSZ-32 (MADE WITH ISOBUTYLAMINE)

| 2Theta | d | $I/I_o \times 100$ |
|---|---|---|
| 7.90 | 11.18 | 71.8 |
| 8.12 | 10.88 | 86.1 |
| 8.86 | 9.97 | 32.6 |
| 11.38 | 7.76 | 49.3 |
| 14.60 | 6.06 | 6.4 |
| 15.86 | 5.58 | 11.4 |
| 16.32 | 5.43 | 14.6 |
| 18.12 | 4.89 | 10.2 |
| 19.72 | 4.50 | 100.0 |
| 20.96 | 4.24 | 73.9 |
| 22.86 | 3.89 | 92.1 |
| 24.02 | 3.70 | 92.1 |
| 24.62 | 3.61 | 65.4 |

TABLE IA-continued

CALCINED SSZ-32 (MADE WITH ISOBUTYLAMINE)

| 2Theta | d | I/I₀ × 100 |
|---|---|---|
| 25.28 | 3.52 | 35.7 |
| 25.98 | 3.43 | 46.0 |
| 28.26 | 3.16 | 13.3 |
| 31.60 | 2.83 | 16.2 |
| 35.52 | 2.52 | 50.4 |

A representative X-ray diffraction pattern for the medium pore size, unidimensional ZSM-23 zeolite may be found in U.S. Pat. No. 4,076,842, issued Feb. 28, 1978 to Plank et al. The X-ray diffraction pattern for ZSM-23 made in accordance with this invention does not differ significantly from that shown by Plank et al.

A representative X-ray diffraction pattern for medium pore size, multidimensional ZSM-5 zeolite may be found in U.S. Pat. No. 3,702,886, issued in 1972. The X-ray diffraction pattern of Table II is that of a ZSM-5 zeolite made in accordance with this invention.

TABLE II

AS-SYNTHESIZED ZSM-5

| 2Theta | d | Rel I |
|---|---|---|
| 7.94 | 11.13 | M |
| 8.84 | 10.00 | S |
| 14.79 | 5.98 | W |
| 20.86 | 4.25 | W |
| 23.09 | 3.85 | VS |
| 23.69 | 3.75 | M |

Table IIA below shows the X-ray diffraction pattern of as-synthesized ZSM-5 made in accordance with this invention, including the intensities of the peaks or lines.

TABLE IIA

AS-SYNTHESIZED ZSM-5

| 2Theta | d | I/I₀ × 100 |
|---|---|---|
| 7.94 | 11.13 | 28.4 |
| 8.84 | 10.00 | 52.6 |
| 14.79 | 5.98 | 9.0 |
| 20.86 | 4.25 | 11.3 |
| 23.09 | 3.85 | 100.0 |
| 23.69 | 3.75 | 22.9 |

The X-ray diffraction pattern of Table III is representative of a medium pore size, unidimensional theta-1 zeolite made in accordance with the present invention.

TABLE III

AS-SYNTHESIZED THETA-1

| 2Theta | d | Rel I |
|---|---|---|
| 8.15 | 10.84 | VS |
| 10.16 | 8.70 | W |
| 12.77 | 6.93 | W |
| 16.32 | 5.43 | W |
| 19.40 | 4.57 | W |
| 20.34 | 4.36 | VS |
| 24.56 | 3.62 | VS |
| 24.67 | 3.47 | M |
| 35.58 | 2.52 | M |

Table IIIA below shows an X-ray diffraction pattern representative of as-synthesized theta-1 made in accordance with this invention, including the intensities of the peaks or lines.

TABLE IIIA

AS-SYNTHESIZED THETA-1

| 2Theta | d | I/I₀ × 100 |
|---|---|---|
| 8.15 | 10.84 | 63.8 |
| 10.16 | 8.70 | 14.6 |
| 12.77 | 6.93 | 19.1 |
| 16.32 | 5.43 | 7.0 |
| 19.40 | 4.57 | 9.0 |
| 20.34 | 4.36 | 100.0 |
| 24.56 | 3.62 | 65.1 |
| 24.67 | 3.47 | 35.8 |
| 35.58 | 2.52 | 21.1 |

Calcination can also result in changes in the intensities of the peaks as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

The medium pore size zeolites prepared by the present process are useful in hydrocarbon conversion reactions. Hydrocarbon conversion reactions are chemical and catalytic processes in which carbon-containing compounds are changed to different carbon-containing compounds. Examples of hydrocarbon conversion reactions include catalytic cracking, hydrocracking, dewaxing, alkylation, isomerization, olefin and aromatics formation reactions, and aromatics isomerization.

The following examples demonstrate, but do not limit, the present invention.

EXAMPLES

There are numerous variations on the embodiments of the present invention illustrated in the Examples which are possible in light of the teachings supporting the present invention. It is therefore understood that within the scope of the following claims, the invention may be practiced otherwise than as specifically described or exemplified.

Example 1

Preparation of SSZ-32 Using Isobutylamine and 2.5 Wt % Seed Crystals

In a 23 ml Teflon cup for a Parr 4745 reactor were added 3.0 ml of a 1.0N KOH solution, 6.3 grams of water, and 0.088 gram of Reheis F2000 hydrated alumina. After all the solids had dissolved, 2.25 grams of Nyacol 2040-NH₄ colloidal silica was added, followed by 0.22 gram of isobutylamine and 0.022 gram of SSZ-32 seeds. The reactor was closed and heated at 170° C. in a Blue M oven while tumbling at 43 rpm for seven days. The resulting solids were collected by filtration and determined by X-ray diffraction ("XRD") to be SSZ-32. The XRD pattern had broad lines, indicative of small crystallites.

Example 2

Preparation of SSZ-32 Using Isobutylamine and 5.0 Wt % Seed Crystals

The procedure of Example 1 was repeated, with the exception that 0.045 gram of SSZ-32 seeds was used. After seven days at 170° C., the product was isolated and determined to be SSZ-32 with a minor amount of Cristobalite.

Example 3

Preparation of SSZ-32 Using Isobutylamine and 3.0 Wt % Seed Crystals

One hundred forty grams of potassium hydroxide (87.2%) were dissolved in 5834 grams of water. Reheis F2000 hydrated alumina (57.3 grams) was added and the mixture was stirred to dissolve all the solids. Nyacol 2040-NH$_4$ colloidal silica (1634.2 grams) was then added, followed by 19.6 grams of SSZ-32 seed crystals. The resulting mixture was stirred as 270.3 ml of isobutylamine was added to the reaction liner. The liner was transferred to a 5-gallon autoclave which was heated to 170° C. and stirred at a rate of 75 rpm. After 48 hours, the product was filtered, washed with water, dried and determined to be SSZ-32. The product's SIO$_2$/Al$_2$O$_3$ mole ratio was found to be 31.

Example 4

Preparation of SSZ-32 Using Isobutylamine With No Seed Crystals

Five hundred forty-four ml of 1.0N KOH solution was mixed with 918.8 grams of water and 14.3 grams of Reheis F2000 hydrated alumina. The resulting mixture was stirred until all the solids had dissolved, and then 408.5 grams of Nyacol 2040-NH$_4$ colloidal silica was added, followed by 67.6 ml of isobutylamine. The reaction liner was transferred to a 1-gallon autoclave which was heated to 170° C. and stirred at a rate of 150 rpm. After 60 hours, the resulting product was isolated and determined by XRD to be SSZ-32 with a trace amount of Cristobalite.

Example 5

Preparation of SSZ-32 Using Trimethylamine and 5 Wt % Seed Crystals

In a 23 ml Teflon cup for a Parr 4745 reactor were added 0.75 gram of a 25% aqueous solution of trimethylamine, 2.88 ml of a 1.0N KOH solution, 0.085 gram of Reheis F2000 hydrated alumina and 7.5 grams of water. After the solids dissolved, 0.89 gram of Cabosil M-5 fumed silica was added, followed by 0.045 gram of SSZ-32 seed crystals. After 12 days at 170° C. and 43 rpm, the resulting product was isolated and determined to be SSZ-32.

Example 6

Preparation of SSZ-32 Using Diisobutylamine and 3.0 Wt % Seed Crystals

The procedure described in Example 4 was repeated with the following changes: 118.75 ml of diisobutylamine was used instead of isobutylamine, and 4.90 grams of SSZ-32 seed crystals was used. After stirring at 150 rpm at 170° C. for 49 hours, the resulting product was isolated and determined by XRD to be SSZ-32. The SiO$_2$/Al$_2$O$_3$ mole ratio of the product was 34.

Example 7

Preparation of SSZ-32 Using Diisopropylamine and 5 Wt % Seed Crystals

In a Teflon liner for a Parr 1-liter autoclave were added 70.6 ml of a 1.0N KOH solution, 209.4 grams of water, and 2.06 grams of Reheis F2000 hydrated alumina. The mixture was stirred until all the solids dissolved, then 21.8 grams of Cabosil M-5 fumed silica was added. Again, the mixture was stirred to dissolve the solids, and 9.9 ml of diisopropylamine was added, followed by 1.06 grams of SSZ-32 seed crystals. The resulting mixture was heated to 170° C. and stirred at 150 rpm for six days. The resulting product was isolated and determined to be SSZ-32 with a minor amount of an unknown material.

Example 8

Preparation of ZSM-23 Using Isobutylamine

The procedure described in Example 1 was repeated except that only 0.044 gram of Reheis F2000 hydrated alumina was used, giving a starting SiO$_2$/Al$_2$O$_3$ mole ratio of 67. In addition, 0.04 gram of SSZ-32 seed crystals was used. After three days at 170° C. at 43 rpm, the resulting product was isolated and determined to be ZSM-23 with a trace amount of Cristobalite.

Example 9

Preparation of ZSM-5 Using Cylopentylamine

In a 23 ml Teflon cup for a Parr 4745 reactor were added 2.88 ml of a 1.0N KOH solution, 0.085 gram of Reheis F2000 hydrated alumina and 7.5 grams of water. After the solids were dissolved, 0.89 gram of Cabosil M-5 fumed silica was added, followed by 0.005 gram of SSZ-32 seed crystals and 0.256 gram of cyclopentylamine. After 11 days at 170° C. and 43 rpm, the resulting product was isolated and determined to be ZSM-5 with a trace amount of an unidentified impurity. Tables II and IIA above indicate the X-ray diffraction lines used to identify the product of this preparation.

Example 10

Preparation of Theta-1 Using Sec-butylamine

In a 23 ml Teflon cup for a Parr 4745 reactor were added 2.88 grams of a 1.0N KOH solution, 4.9 grams of water, and 0.084 gram of Reheis F2000 hydrated alumina. After the solids dissolved, 2.17 grams of Nyacol 2040-NH$_4$ colloidal silica was added, followed by 0.29 ml of sec-butylamine and 0.04 gram of SSZ-32 seed crystals. After six days at 170° and 43 rpm, the resulting product was isolated and determined to be theta-1 (TON) with a trace amount of Cristobalite. The peaks in the XRD pattern for this product were very broad, indicative of very small crystallites.

Example 11

Preparation of Theta-1 Using Sec-butylamine

The procedure described in Example 10 was repeated with the following changes: 0.056 gram of Reheis F2000 hydrated alumina was used (giving a starting $SiO_2/Al_2O_3$ mole ratio of 50 rather than 33) and 0.03 gram of theta-1 seed crystals was used. After four days at 170° C. and 43 rpm, the resulting product was isolated and determined by XRD to be theta-1 (TON) with a trace amount of Cristobalite. This XRD pattern for this product had much sharper peaks than that in Example 10.

Example 12

Preparation of Theta-1 Using Cis-2,5-dimethylpyrrolidine

A solution was prepared using 0.083 gram Reheiss F-2000 hydrated alumina, 0.20 gram solid KOH and 11.40 grams water. Cabosil fumed silica (0.90 gram) and 3 mmole of cis-2,5-dimethylpyrrolidine were added to the reaction mixture which was then sealed and heated for ten days at 170° C. at 43 rpm. A crystalline product formed which was identified as theta-1.

Example 13

Preparation of Theta-1 Using Cis-2,6-dimethylpiperidine

A solution was prepared using 2.58 grams of Reheiss F-2000 hydrated alumina, 6.20 grams of solid KOH and 337 grams of water. To this solution was added 10.50 grams of cis-2,6-dimethylpiperidine and 28 grams of Cabosil fumed silica. The resulting reaction mixture was brought to 170° C. over eight hours, held at this temperature for six days and stirred at 100 rpm over this period. The reaction produced a good quality theta-1 crystalline product.

What is claimed is:

1. A process for preparing a unidimensional, medium pore size zeolite which comprises:
   (a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) at least one small, neutral amine capable of forming the zeolite, said amine containing four to about eight carbon atoms and (a) only carbon, nitrogen and hydrogen atoms, (b) one primary, secondary or tertiary, but not quaternary, amino group, and (c) a tertiary nitrogen atom, or at least one tertiary carbon atom, or a nitrogen atom bonded directly to at least one secondary carbon atom;
   (b) maintaining the aqueous solution under conditions sufficient to form crystals of the zeolite; and
   (c) recovering the crystals of the zeolite,
wherein said process is conducted in the absence of a quaternary ammonium compound.

2. The process of claim 1 wherein said aqueous solution comprises, in terms of mole ratios, the following:

| $YO_2/W_2O_3$ | 15–100 |
|---|---|
| $OH^-/YO_2$ | 0.10–0.40 |
| $Q/YO_2$ | 0.05–0.50 |
| $M_{2/n}/YO_2$ | 0.05–0.40 |
| $H_2O/YO_2$ | 10–70 | where Y is silicon, germanium or mixtures thereof; W is aluminum, iron, gallium, indium, titanium or mixtures thereof; Q is at least one small, neutral amine capable of forming the zeolite, said amine containing four to about eight carbon atoms and (a) only carbon, nitrogen and hydrogen atoms, (b) one primary, secondary or tertiary, but not quaternary, amino group, and (c) a tertiary nitrogen atom, or at least one tertiary carbon atom, or a nitrogen atom bonded directly to at least one secondary carbon atom; M is an alkali metal, alkaline earth metal or mixtures thereof; and n is the valence of M, wherein said process is conducted in the absence of a quaternary ammonium compound.

3. The process of claim 2 wherein said aqueous solution comprises, in terms of mole ratios, the following:

| $YO_2/W_2O_3$ | 25–50 |
|---|---|
| $OH^-/YO_2$ | 0.15–0.30 |
| $Q/YO_2$ | 0.10–0.30 |
| $M_{2/n}/YO_2$ | 0.075–0.30 |
| $H_2O/YO_2$ | 25–50. |

4. The process of claim 1 wherein the small, neutral amine is selected from the group consisting of isobutylamine, diisobutylamine, diisopropylamine, sec-butylamine, 2,5-dimethylpyrrolidine and 2,6-dimethylpiperidine.

5. The process of claim 1 further comprising replacing the alkali metal cations, alkaline earth metal cations, or both of the recovered zeolite, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

6. The process of claim 5 wherein said replacing cation is hydrogen or a hydrogen precursor.

7. The process of claim 1 wherein the medium pore size zeolite is theta-1.

8. The process of claim 1 wherein said process is performed in the absence of any nitrogen-containing organic templating agent other than the small, neutral amine.

9. A unidimensional, medium pore size zeolite composition, as-synthesized and in the anhydrous state, whose general formula, in terms of mole ratios, is as follows:

| $YO_2/W_2O_3$ | $\geq 15$ |
|---|---|
| $Q/YO_2$ | 0.02–0.10 |
| $M_{2/n}/YO_2$ | 0.015–0.10 | wherein Y is silicon, germanium or a mixture thereof; W is aluminum, gallium, indium, iron, titanium, or mixtures thereof; Q is at least one small, neutral amine capable of forming the zeolite, said amine containing four to about eight carbon atoms and (a) only carbon, nitrogen and hydrogen atoms, (b) one primary, secondary or tertiary, but not quaternary, amino group, and (c) a tertiary nitrogen atom, or at least one tertiary carbon atom, or a nitrogen atom bonded directly to at least one secondary carbon atom; M is alkali metal cation, alkaline earth metal cations or mixtures thereof, n is the valence of M, wherein said composition does not contain a quaternary ammonium compound.

10. The medium pore size zeolite composition of claim 9 wherein the small, neutral amine is selected from the group consisting of isobutylamine, diisobutylamine, diisopropylamine, sec-butylamine, 2,5-dimethylpyrrolidine and 2,6-dimethylpiperidine.

11. The medium pore size zeolite composition of claim 10 having the X-ray diffraction lines of Table III.

12. The medium pore size zeolite composition of claim 10 wherein said composition does not contain any nitrogen-containing organic templating agent other than the small, neutral amine.

13. A process for preparing the zeolite ZSM-5 having the X-ray diffraction lines of Table II which comprises:

(a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) cyclopentylamine;
  (b) maintaining the aqueous solution under conditions sufficient to form crystals of the zeolite; and
  (c) recovering the crystals of the zeolite.

14. The process of claim 13 wherein said aqueous solution comprises, in terms of mole ratios, the following:

| | |
|---|---|
| $YO_2/W_2O_3$ | 15–100 |
| $OH^-/YO_2$ | 0.10–0.40 |
| $Q/YO_2$ | 0.05–0.50 |
| $M_{2/n}/YO_2$ | 0.05–0.40 |
| $H_2O/YO_2$ | 10–70 | where Y is silicon, germanium or mixtures thereof; W is aluminum, iron, gallium, indium, titanium or mixtures thereof; Q is cyclopentylamine; M is an alkali metal, alkaline earth metal or mixtures thereof; and n is the valence of M.

15. The process of claim 13 wherein said process is conducted in the absence of a quaternary ammonium compound.

16. The process of claim 13 wherein said process is conducted in the absence of any nitrogen-containing organic templating agent other than the cyclopentylamine.

17. The zeolite ZSM-5, as-synthesized and in the anhydrous state, whose general formula, in terms of mole ratios, is as follows:

| | |
|---|---|
| $YO_2/W_2O_3$ | $\geq 15$ |
| $Q/YO_2$ | 0.02–0.10 |
| $M_{2/n}/YO_2$ | 0.015–0.10 | wherein Y is silicon, germanium or a mixture thereof; W is aluminum, gallium, indium, iron, titanium, or mixtures thereof; Q is cyclopentylamine; M is alkali metal cation, alkaline earth metal cations or mixtures thereof, and n is the valence of M.

18. The zeolite of claim 17 wherein said zeolite does not contain a quaternary ammonium compound.

19. The zeolite of claim 17 wherein said zeolite does not contain any nitrogen-containing organic templating agent other than the cyclopentylamine.

* * * * *